United States Patent
Brandenstein et al.

(10) Patent No.: US 6,579,012 B2
(45) Date of Patent: Jun. 17, 2003

(54) BEARING RING

(75) Inventors: Manfred Brandenstein, Eussenheim (DE); Hans-Jürgen Friedrich, Königsberg (DE); Hubert Herbst, Gädheim (DE); Peter Horling, Mainberg (DE)

(73) Assignee: SKF GmbH, Schweinfurt (DE)

( * ) Notice: Subject to any disclaimer, the term of this patent is extended or adjusted under 35 U.S.C. 154(b) by 19 days.

(21) Appl. No.: 09/920,836

(22) Filed: Aug. 3, 2001

(65) Prior Publication Data

US 2002/0025095 A1 Feb. 28, 2002

(30) Foreign Application Priority Data

Aug. 4, 2000 (DE) .......................... 100 38 848

(51) Int. Cl.⁷ ............................................. F16C 43/04
(52) U.S. Cl. .................. 384/585; 384/537; 29/451; 29/898.066; 29/898.051
(58) Field of Search ....................... 384/585, 584, 384/537; 29/451, 523, 522.1, 898.066, 898.05, 898.041, 898, 898.03, 898.051

(56) References Cited

U.S. PATENT DOCUMENTS

| | | | | |
|---|---|---|---|---|
| 1,955,195 A | * | 4/1934 | Lothrap et al. | 29/898.066 |
| 2,724,172 A | * | 11/1955 | Potter | 29/898.045 |
| 2,961,744 A | * | 11/1960 | Jagen | 29/898.066 |
| 3,626,566 A | | 12/1971 | Kilgour | |
| 3,710,471 A | * | 1/1973 | Pitner | 29/898.066 |
| 5,414,899 A | * | 5/1995 | Raetz | 16/380 |
| 6,148,491 A | * | 11/2000 | Bartocci | 29/17.3 |
| 6,439,775 B1 | * | 8/2002 | Ito | 384/559 |

FOREIGN PATENT DOCUMENTS

| | | | |
|---|---|---|---|
| DE | 927780 | | 5/1955 |
| DE | 1222322 | | 10/1968 |
| DE | 2411907 | | 9/1974 |
| DE | 3409247 | * | 9/1985 |
| EP | 213160 | | 8/1986 |
| EP | 485001 | * | 5/1992 |
| FR | 2592108 | | 6/1987 |
| FR | 2688837 | * | 5/1992 |
| FR | 2688837 | | 9/1993 |
| GB | 1351217 | * | 4/1974 |

* cited by examiner

Primary Examiner—Christopher R. Schwartz
Assistant Examiner—Devon Kramer
(74) Attorney, Agent, or Firm—Burns, Doane, Swecker & Mathis, L.L.P.

(57) ABSTRACT

A bearing ring includes a first ring part having a first peripheral surface forming a rolling body retaining track or a sliding surface and a second peripheral surface, and a concentrically arranged second ring part having first and second peripheral surfaces. The first and second ring parts are pressed together to plastically mold the second peripheral surface of the first ring part into the first peripheral surface of the second ring part through axial expansion. During manufacture, one tool grasps the first peripheral surface of the first ring part and presses it into a predeterminable shape and another tool supports the second peripheral surface of the second ring part. The first ring part is pressed against the second ring part, with the contour of the second peripheral surface of the first ring part being plastically molded into the first peripheral surface of the second ring part through axial flow forming.

21 Claims, 6 Drawing Sheets

BEARING RING

This application is based on and claims priority under 35 U.S.C. § 119 with respect to German Application No. 100 38 848.5 filed on Aug. 4, 2000, the entire content of which is incorporated herein by reference.

FIELD OF THE INVENTION

The present invention generally relates to bearings. More particularly, the present invention pertains to a bearing ring having a track for retaining rolling bodies or a sliding surface, a method for manufacturing such a bearing ring, and a roller or plain bearing that includes such a bearing ring.

BACKGROUND OF THE INVENTION

Many different types of bearing rings are known and can be produced in a variety of different ways. As a general rule, the production techniques used to form a bearing ring become more complex and expensive as the need for resistance to deformation in the bearing ring increases. The resistance to deformation in the area of the track or sliding surface of the bearing ring has an especially significant effect on the technical qualities of the bearing for which the bearing ring is produced. It is desirable that the diameter of the track or the sliding surface be kept as exact as possible with respect to both its absolute value and possible relative deviations, i.e., with respect to its roundness. One problem with this is that although the criteria of the shaving soft-processing of the bearing ring can be met at acceptable costs, the necessary subsequent hardening process causes deviations in the dimensions due to a thermal delay of the bearing ring. To fulfill the high precision requirements, it is therefore usually necessary after the hardening to carry out a shaving hard-processing of the bearing ring until the desired final dimensions are achieved. However, this hard processing is relatively complex and expensive.

DE 34 09 247 A1 describes a method for producing bearing seats with accurately positioned axes in light-alloy die castings in which needle sleeves are pressed into calibrated sinter parts. DE 21 17 018 C2 describes a hardened bearing sleeve that is pressed into a non-hardened outer collar. The two-piece bearing ring that is manufactured according to this method is pressed into a mold with the help of a needle, whereby the outer diameter of the bearing ring is calibrated by high-pressure molding.

In light of the foregoing, a need exists for a bearing ring that is able to fulfill the very high requirements of relatively precise or exact dimensioning in the area of its track or sliding surface without being excessively expensive.

It would also be desirable to provide a method of manufacturing such a bearing ring that does not entail the same complex and expensive processing as the known methods mentioned above.

SUMMARY OF THE INVENTION

According to one aspect of the invention, a bearing ring is designed as a two-piece bearing ring in the radial direction and includes a first ring part and a second ring part that are arranged concentrically to one another. The first and second ring part are pressed together in such a way that the peripheral surface of the first ring part is plastically molded into the peripheral surface of the second ring part through an axial flow forming process.

The materials used for the first and the second ring part are preferably of different hardness, with a material of greater hardness being used for the first ring part.

If the bearing ring is an outer ring, the first ring part or the second ring part can advantageously be provided with a flange that makes it easier to secure the bearing ring during subsequent installation.

In an axial portion of the peripheral surface of the first ring part that butts against the second ring part, the first ring part deviates from a cylindrical shape in the direction of a reduction of the cross-section of the first ring part. This axial portion is adjacent to the front of the first ring part. This yields an extremely intimate connection between the two ring parts so that the ring parts permanently maintain the shape they are given at the time they are joined.

This bearing ring construction is quite useful and entails advantages in the manufacture of the bearing ring while also ensuring that the two ring parts are permanently joined. The first and second ring parts are pressed together so that the second peripheral surface of the first ring part and the first peripheral surface of the second ring part lie against one another, with the first peripheral surface of the first ring part and the second peripheral surface of the second ring part forming the peripheral surfaces of the resulting bearing ring.

The production technique in accordance with the present invention involves the first ring part being first pressed into a pre-determined shape by way of a first tool in the area of its first peripheral surface, with the first ring part then being pressed concentrically against the second ring part with the help of this first tool. During this pressing, the second ring part is supported by a second tool to prevent distortion of the second ring part in the area of its second peripheral surface. In the area of the first peripheral surface of the second ring part, the contour of the second peripheral surface of the first ring part is plastically molded into the first peripheral surface of the second ring part through axial flow forming.

One advantage associated with this process of joining the first and second ring parts in accordance with the present invention is that the bearing ring produced in this manner has a high-precision circular cross-section in the area of its track or sliding surface.

To effect or produce axial expansion of the second ring part, an overlap between the first ring part and the second ring part is preferably utilized. This radial overlap is chosen to be at least 100 $\mu$m. More specifically, the radial overlap is selected to correspond to the maximum thickness of the wall of the second peripheral surface of the first ring part plus at least 50 $\mu$m. Through the axial flow forming, the wall thickness of the second ring part is reduced by 5% to 20%, preferably 10% to 18%. More preferably, the wall thickness of the second ring part is reduced by approximately 12%.

In the manufacture of an outer ring, the first tool is shaped as a solid cylinder, and in the manufacture of an inner ring, the first tool has a cylindrical bore. Each second tool is molded complementary to the first tool, and its measurements deviate from the first tool by the thickness of the wall of the bearing ring to be produced.

According to another aspect of the invention, a roller bearing or plain bearing includes the combination of an inner ring and an outer ring. At least one of the inner ring and the outer ring includes a first ring part having a first peripheral surface forming a track or sliding surface and a second peripheral surface, and a second ring part having a first peripheral surface and a second peripheral surface. The second ring part is positioned concentrically to the first ring part. The first ring part and the second ring part are pressed together, with the second peripheral surface of the first ring part being plastically molded into the first peripheral surface of the second ring part through axial flow forming of the second ring part.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 2b is an enlarged cross-sectional view of a portion of the outer ring shown in FIG. 2a;

FIG. 4b is an enlarged cross-sectional view of a portion of the inner ring shown in FIG. 4a.

DETAILED DESCRIPTION OF THE INVENTION

FIGS. 1a–1d show various individual steps performed in the manufacturing procedure for producing an outer ring in accordance with the present invention. The drawing figures show four snapshots during the manufacturing procedure and it is to be understood that the illustrations are extremely simplified, not necessarily correlating to the chronological course of the production technique.

Figure 1A:
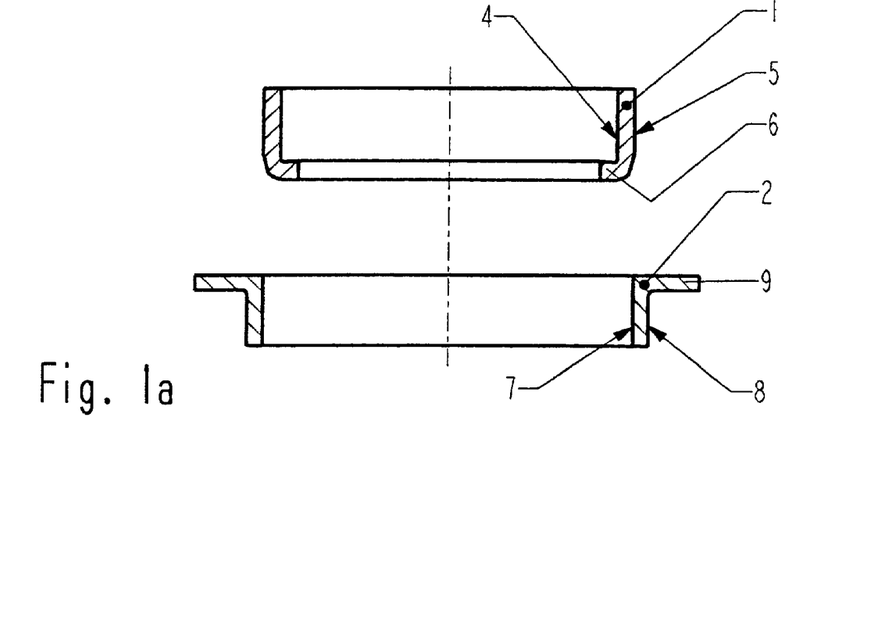
FIGS. 1a–1d are cross-sectional views of the parts used to form an outer ring in accordance with the present invention as well as an illustration of the individual steps associated with the manufacturing procedure.
Figure 2A:
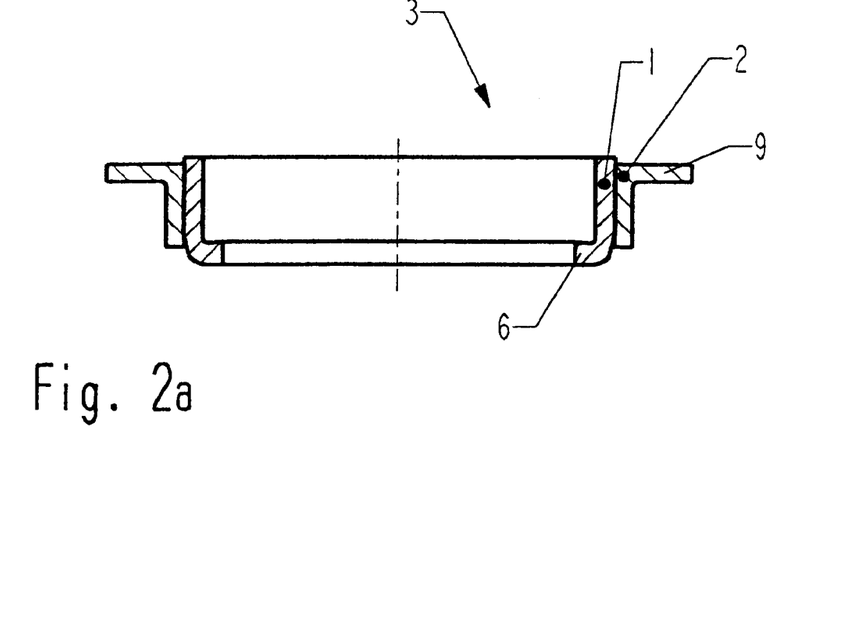
FIG. 2a is a cross-sectional view of the outer ring produced in accordance with the present invention.

Referring initially to FIG. 1a, an outer ring 3, shown in its completed state in FIG. 2a, is produced from a first ring part 1 and a second ring part 2. The first ring part 1 has an inner peripheral surface 4 and an outer peripheral surface 5. The inner peripheral surface 4 is designed as a track for retaining rolling bodies or as a sliding surface. The implementation of the first ring part 1 shown here has a radially inwardly directed flange 6. The second ring part 2 has an inner peripheral surface 7, an outer peripheral surface 8 and a radially outwardly directed flange 9.

Figure 1B:
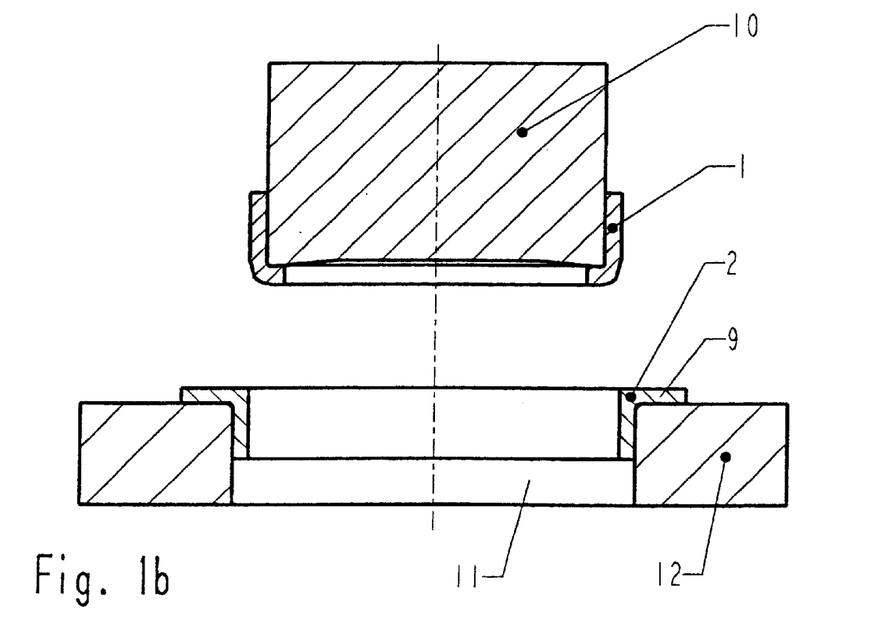

As shown in FIG. 1b, a cylindrical stamp 10 forming one tool is pressed into the first ring part 1 during the first step of the procedure. The stamp 10 is extremely precisely manufactured and is therefore a virtually perfect cylinder. This cylindrical shape is transferred to the first ring part 1 when the stamp 10 is pressed into the inner surface 4 of the first ring part 1. During this pressing, a certain overlapping exists between the stamp 10 and the first ring part 1 so that there is normally an elastic deformation of the first ring part 1. As a result, the inner peripheral surface 4 of the first ring 1 lies substantially exactly flush against the cylindrical surface of the stamp 10. Thus, the desired dimensions of the inner diameter of the first ring part 1 are achieved through the pressing in of the stamp 10. Any possible unevenness in the roundness of the inner peripheral surface 4 of the first ring part 1 is also reduced.

However, without additional measures, the effects mentioned above would be eliminated through the removal of the stamp 10 from the first ring part 1, to such an extent that the first ring part 1 would be elastically distorted. Thus, suitable counter-measures that prevent the first ring part 1 from springing back into its original shape are implemented in the subsequent steps of the manufacturing procedure in accordance with the present invention.

In the step shown in FIG. 1b, a cylindrical bore 11 of another tool 12 forming a support is guided into the second ring part 2 (or the second ring part 2 is guided into the cylindrical bore 11 of the tool 12) so that the second ring part 2 is supported at its outer peripheral surface 8 on the tool 12.

Figure 1C:
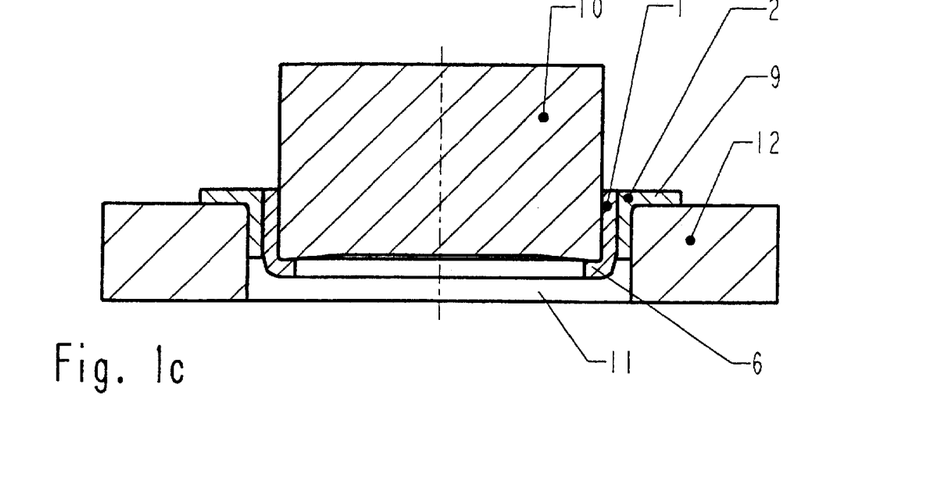

The first ring part 1 is then pressed into the second ring part 2 with the help of the stamp 10 as shown in FIG. 1c. The size of the overlap between the first ring part 1 and the second ring part 2 (i.e., the difference between the outside diameter of the first ring part and the inner diameter of the second ring part 2) is selected to achieve a plastic distortion of the second ring part 2 during this pressing-in process. This overlap is preferably at least 100 $\mu$m. More specifically, the selected overlap preferably corresponds to the size of the maximum thickness of the upstanding wall of the outer peripheral surface 5 of the first ring part 1, plus a value of at least 50 $\mu$m. In this case, the maximum thickness of the wall is defined as the difference between the largest and the smallest local radius in the cylindrical shaped area of the outer peripheral surface 5 of the first ring part 1 after the stamp 10 has been pressed in. As a general rule, the maximum thickness of the wall is approximately 60 $\mu$m, so that an overlap of at least 110 $\mu$m, and possibly greater, is typically chosen. The overlap described above is significantly greater than what is used for a typical press seating.

To help facilitate and ensure that it is exclusively or at least primarily the second ring part 2 that is distorted when the first ring part 1 is pressed into the second ring part 2, a harder material is chosen for the first ring part 1 than for the second ring part 2. Furthermore, the area of the first ring part 1 that comes into contact with the second ring part 2 during the pressing-in process is shaped in such a way that the second ring part 2 is molded into the desired shape during the pressing-in process.

Specifically, an axial flow forming or axial expansion takes place during the pressing-in process in which the first ring part 1 serves as a flow forming stamp and the second ring part 2 is axially flow formed. Through the axial flow forming process, the material of the second ring part 2 is compressed and displaced, whereby the thickness of the wall is significantly reduced. The thickness of the wall is reduced by a value of between 5% and 20% of the original thickness of the wall, preferably between 10% and 18% of the original thickness of the wall, and more preferably is reduced by about 12% of the original thickness of the wall.

As a result of the axial flow forming process, the contour of the outer peripheral surface 5 of the first ring part 1 is molded into the second ring part 2, and both ring parts 1, 2 are securely joined to one another. This joining is effected by the frictional connection or engagement between the two ring parts 1, 2. Depending on the stages of the reshaping process, this joining may also be effected through an additional form connection.

Figure 1D:
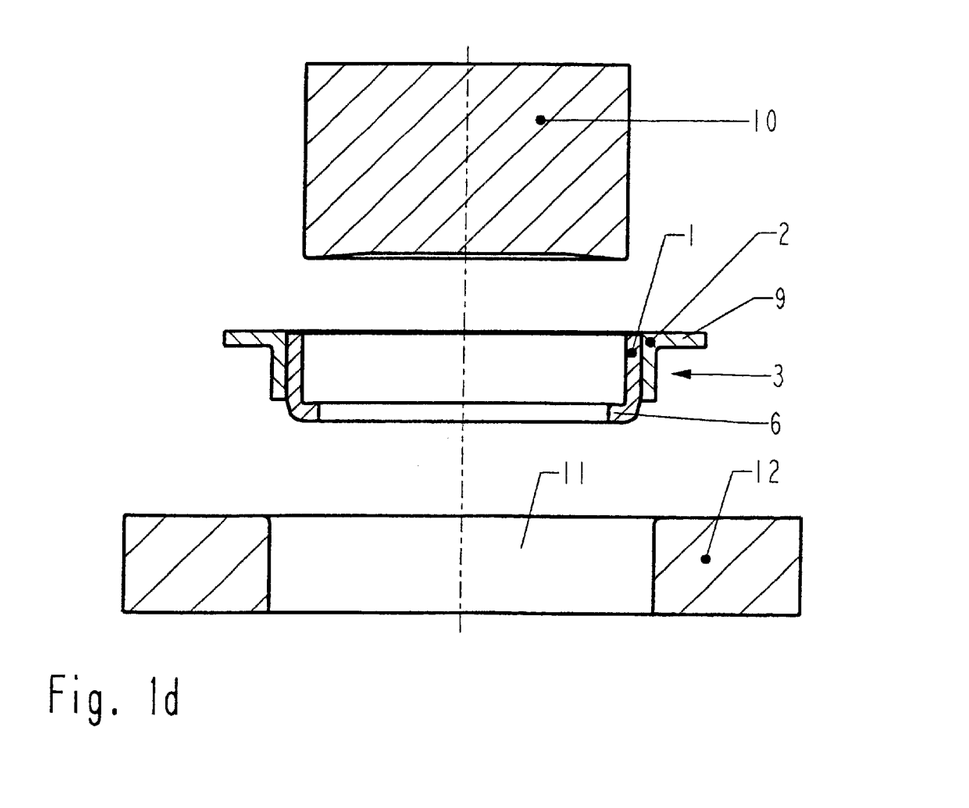

As shown in FIG. 1d, the stamp 10 and the tool 12 are removed after the pressing together of the first and second ring parts 1, 2. Because the second ring part 2 is plastically molded and lies securely flush against the first ring part 1, the reshaping of the two ring parts 1, 2 is maintained, and thus especially the precisely dimensioned cylindrical shape of the inner peripheral surface 4 of the first ring part 1 is essentially maintained even after the stamp 10 and the tool 12 have been removed. The outer ring 3 produced in this way thus has an extremely precise track or sliding surface.

Figure 2B:
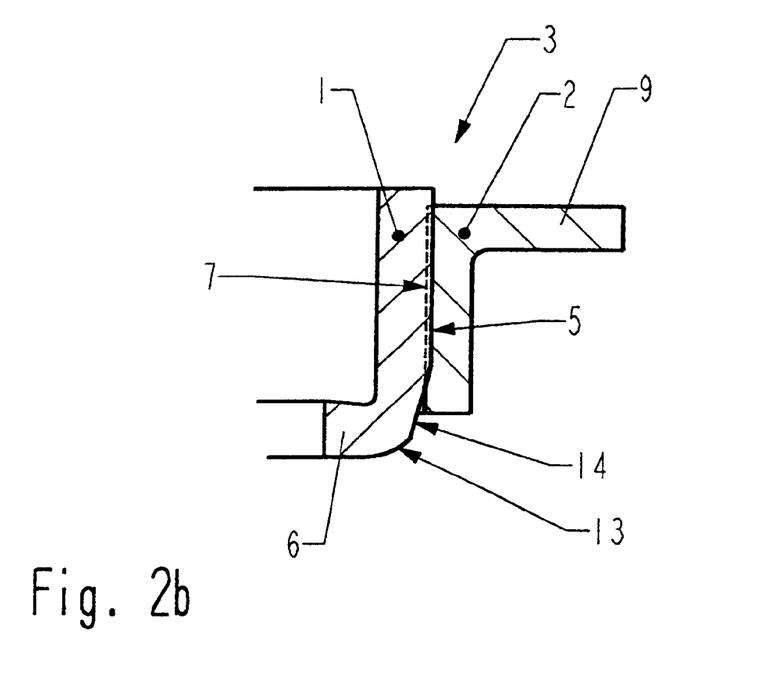

FIGS. 2a and 2b show the bearing ring in accordance with the present invention implemented as an outer ring 3, with FIG. 2b depicting an enlarged view of a portion of the outer ring. The dashed line in FIG. 2b shows the general course or contour of the inner peripheral surface 7 of the second ring part 2 before the two ring parts 1, 2 are pressed together. As seen from FIG. 2b, after the two ring parts 1, 2 are pressed together so that the two ring parts are concentrically arranged with respect to one another, the inner peripheral surface of the second ring part 2 deviates from this dashed line (i.e., is shifted outwardly from the dashed line) due to the plastic distortion of the second ring part and now corresponds to the outer peripheral surface 5 of the first ring part 1 which was not changed during the pressing-in process.

To achieve or help facilitate a plastic distortion of the second ring part 2, the first ring part 1 is designed in such a way that the diameter of the outer peripheral surface 5 decreases toward the front with which the first ring part 1 is pressed into the second ring part 2. That is, the diameter of the outer peripheral surface 5 of the first ring part 1 gradually decreases toward the end of the first ring part 1 that adjoins the inwardly directed flange 6. The enlarged cross-sectional view of the contour shown in FIG. 2b has proven to be especially advantageous in this context. In this implementation, the outer peripheral surface 5 of the first ring part 1 is designed as a convex bent surface 13 in the transition area toward the front, on which the flange 6 is also arranged, so that the outer peripheral surface 5 continuously transforms into the exterior of the flange 6. A conical section 14 butts against the convex bent surface 13 on the outer peripheral surface 5 of the first ring part 1, within which the outer diameter of the ring part 1 continuously increases up to a maximum value. The outer diameter of the remaining axial area remains constant at this maximum value, i.e., the outer peripheral surface 5 has a cylindrical shape.

To achieve the flow forming effects required for the manufacture of the outer ring 3, values between 7° and 15° are chosen for the angle that includes the conical section 14 with the cylindrical shaped area of the outer peripheral surface 5. In the area of the transition between the conical and cylindrical shape, a radius of a maximum of 0.3 mm can be arranged on the outer peripheral surface 5.

Through implementation of the present invention described above, by pressing the first ring part 1 into the second ring part 2, little or no material is scraped off. Instead, there is a distortion and/or a compression of the material of the second ring part 2, involving a plastic deformation or flow of material in the axial direction to produce the aforementioned axial flow forming and slightly also in the radial direction. Depending on the intended use, deviations from the above are possible, whereby a continuous transition from the outer peripheral surface 5 to the front of the first ring part 1 without edges has proven to be advantageous.

FIGS. 3a–3d illustrate the individual steps of the manufacturing procedure for producing an inner ring 15 (shown in FIGS. 4a and 4b) in accordance with the present invention. The process for manufacturing the inner ring 15 is, in principle, the same as that used to produce the outer ring 3.

The inner ring 15 is produced from a first ring part 17 and a second ring part 18. In the implementation shown in FIG. 3a, the first ring part 17 is designed as a cylindrical hull without a flange. The first ring part 17 has an inner peripheral surface 19 and an outer peripheral surface 20 which are designed as a track for retaining rolling bodies or as a sliding surface. The second ring part 18 has an inner peripheral surface 21 and an outer peripheral surface 22.

Figure 3A:
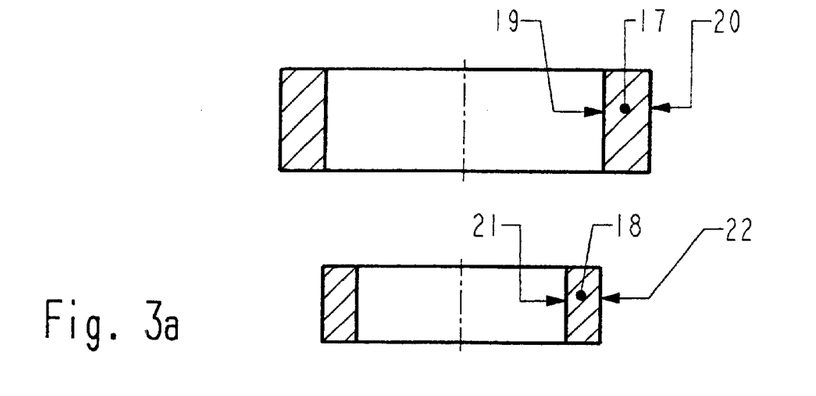
FIGS. 3a–3d are cross-sectional views of the parts used to form an inner ring in accordance with the present invention as well as an illustration of the individual steps associated with the manufacturing procedure.
Figure 3B:
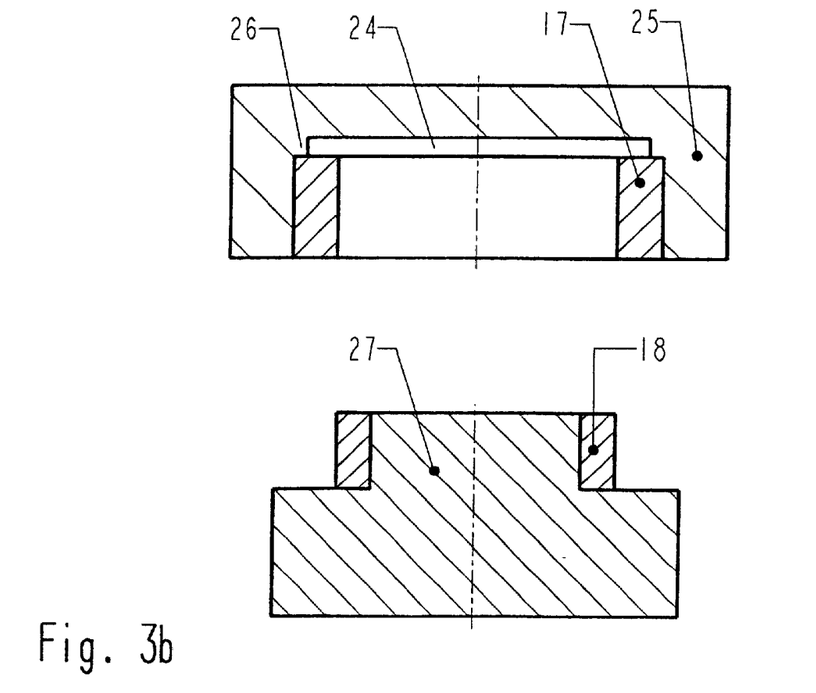

According to FIG. 3b, to manufacture the inner ring 15, the first ring part 17 is pressed into an extremely precisely manufactured cylinder or cylindrical bore 24 of a tool 25 until its front side (i.e., the side facing the bore) butts against a shoulder 26 running around the cylindrical bore 24 as shown in FIG. 3b. Here, the overlap is selected so that the outer peripheral surface 20 of the first ring part 17 lies flush against the cylinder bore 24 of the tool 25 through the pressing process, and therefore takes the high-precision cylindrical shape of the cylinder bore 24. A cylindrical stamp 27 is inserted into the second ring part 18 (or the second ring part 2 is placed on the cylindrical stamp 27) so that the stamp 27 supports the second ring part 18 by its inner peripheral surface 21 in the subsequent pressing process.

Figure 3C:
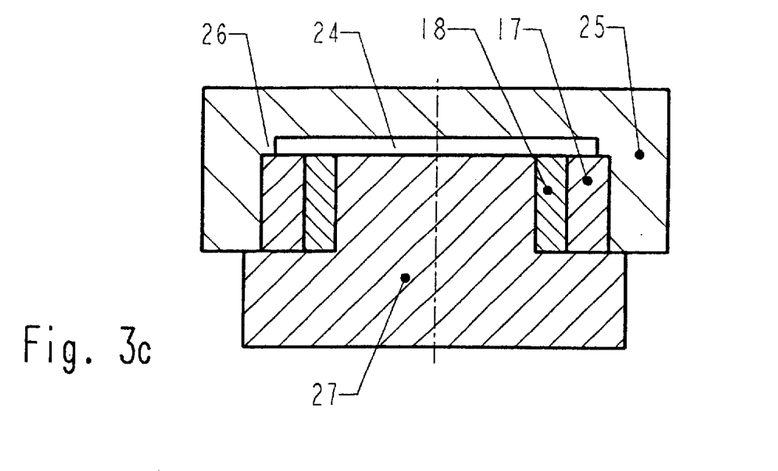

In the following step shown in FIG. 3c, the two ring parts 17, 18 are pressed together, whereby the first ring part 17 is pushed over the second ring part 18 (or the second ring part 18 is pushed into the first ring part 17). During the pressing process, the first ring part 17 remains in the cylinder bore 24 and the second ring part 18 remains on the stamp 27. In this way, the inner peripheral surface 21 of the second ring part 18 and especially the outer peripheral surface 20 of the first ring part 17 do not become distorted. However, during the pressing process, the outer peripheral surface 22 of the second ring part 18 is distorted by the first ring part 17 in such a way that the outer peripheral surface 22 of the second ring part 18 assumes the contour of the inner peripheral surface 19 of the first ring part 17. Here, an overlap is chosen which is determined in the same manner as in the procedure described above for manufacturing the outer ring 3. That is, as a general rule, the radial overlap should be at least 100 $\mu$m. More specifically, the radial overlap is selected to be at least 50 $\mu$m greater than the maximum thickness of the wall on the inner peripheral surface 19 of the first ring part 17. As the maximum thickness of the wall of the first ring part is typically approximately 60 $\mu$m, this means a preferable radial overlap of 110 $\mu$m or greater. Also, a harder material is used for the first ring part 17 than for the second ring part 18 and so the inner peripheral surface 19 of the first ring part 17 remains largely unchanged.

An axial flow forming process involving plastic deformation or flow of material also takes place in the manufacture of the inner ring 15. The first ring part 17 serves as an expansion or flow forming tool and the second ring part 18 is subjected to a flow forming process, resulting in a compression and displacement of the material as well as a reduction of the thickness of the wall of the second ring part 18. The values for the reduction of the thickness of the wall correspond to those described above for the outer ring 3.

Figure 3D:
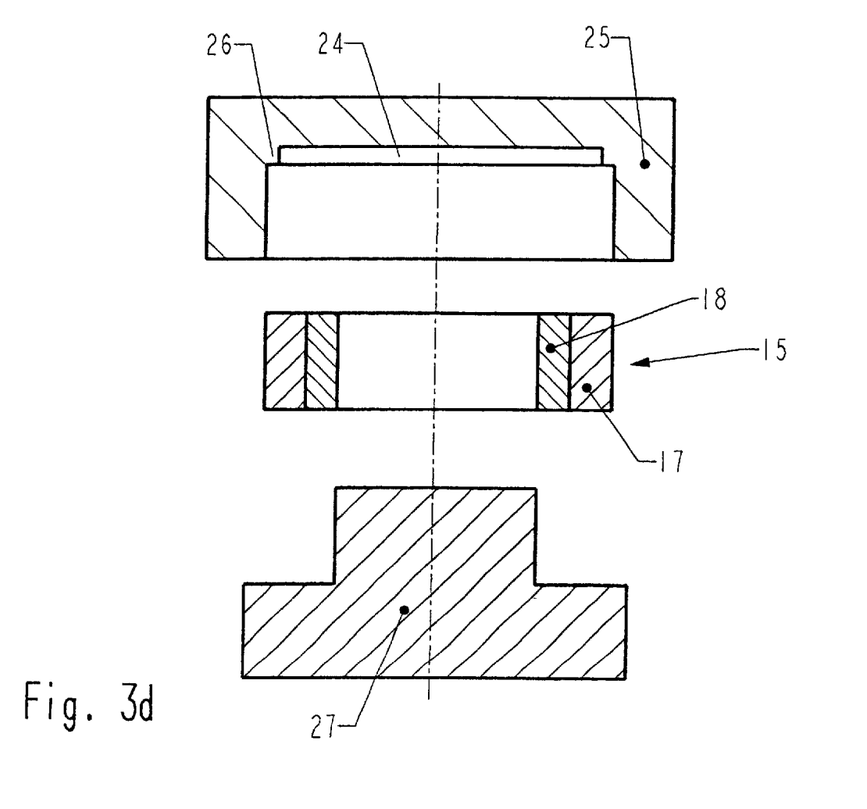

The molding of the contour of the inner peripheral surface 19 of the first ring part 17 into the outer peripheral surface 22 of the second ring part 18 creates a secure connection between both ring parts 17, 18. This secure connection is retained even after the stamp 27 and the tool 25 are removed, and has a shape stabilizing effect. As a result of this, the precise cylindrical shape of the outer peripheral surface 20 of the first ring part 17 produced with the help of the tool 25 is largely retained. FIG. 3d shows the finished inner ring 15 after the removal of the tool 25 and the stamp 27.

Figure 4A:
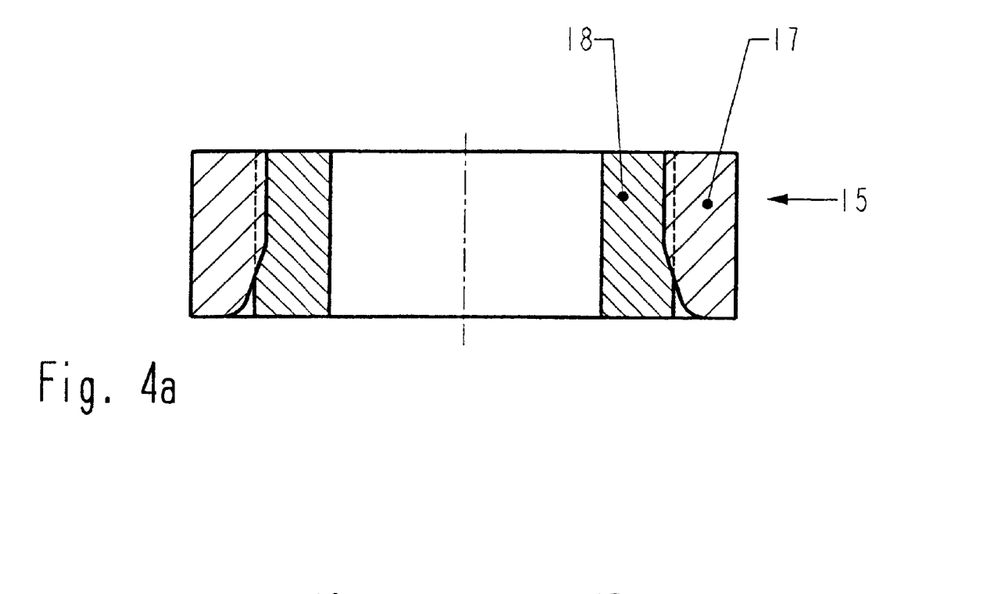
FIG. 4a is a cross-sectional view of the inner ring in accordance with the present invention.
Figure 4B:
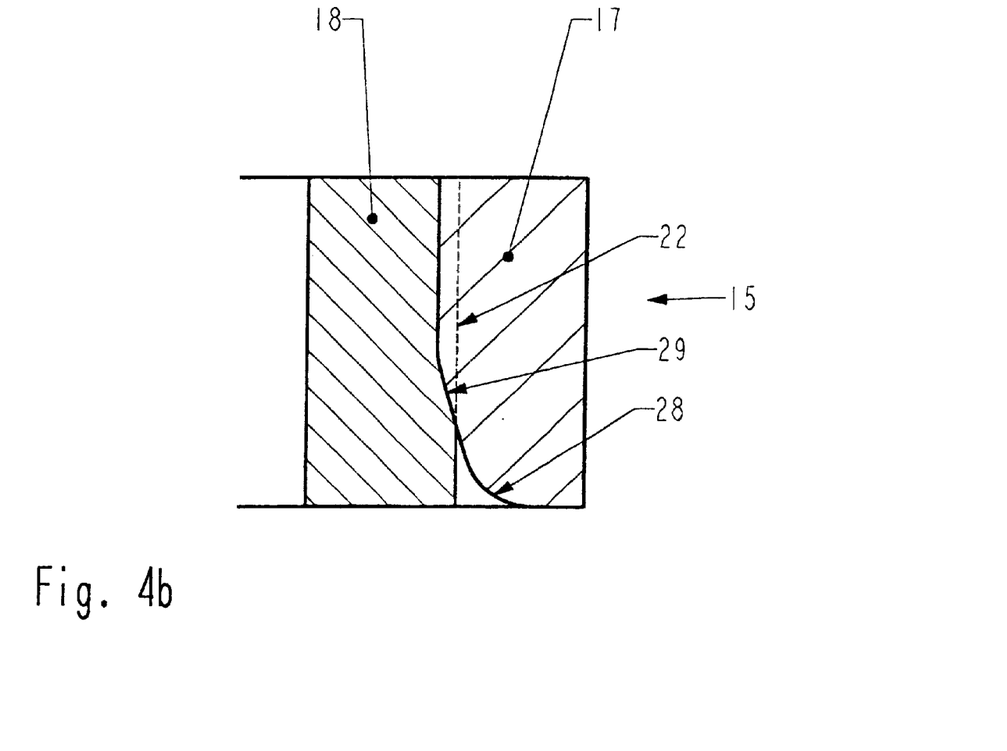

FIGS. 4a and 4b show a cross-sectional view of the bearing ring in accordance with the present invention designed as an inner ring 15, with FIG. 4b showing an enlarged portion of the cross-section shown in FIG. 4a. As illustrated, the two ring parts 17, 18 are concentrically arranged with respect to one another.

In a manner similar to the outer peripheral surface 5 of the first ring part 1 of the inner ring 3 shown in FIG. 2b, the inner peripheral surface 19 of the first ring part 17 of the inner ring 15 is also designed in such a way that the desired plastic remolding of the ring part 18 is made possible through the pressing together of the two ring parts 17, 18. To facilitate this, the inner peripheral surface 19 of the first ring part 17 is designed as a convex bent surface 28 in the area at least at the front end of the first ring part 17 so that the first ring part 17 expands radially toward this front. Butting against the convex bent surface 28 is a conical surface 29, within which the inner diameter of the first ring part 17 continuously decreases to a constant value, which is the same as the inner peripheral surface 19 throughout the remaining axial area. The angle that includes the conical surface 29 with the area with a constant inner diameter is between 7° and 15°. In the overlap between the conical surface 29 and the area with a constant inner diameter, the inner peripheral surface 19 can be bent, whereby the radius of the bend may be a maximum of 0.3 mm. To more clearly illustrate the effects of the remolding process, the course or contour of the outer peripheral surface 22 of the second ring part 18 before the extrusion of the first ring part 17 is represented by a dashed line.

In one variation of the invention, the track or the sliding surfaces of the bearing rings are not cylindrical, but rather are conical in shape. Accordingly, a conical stamp 10 or a tool 25 with a conical bore 24 is used. The design of the stamp 10 or the bore 24 of the tool 25 depends on the desired contour of the track or the sliding surface.

The bearing ring manufactured in accordance with the present invention can be used in exactly the same manner as conventional one-piece bearing rings. That is, the outer ring 3 in accordance with the present invention and the inner ring 15 in accordance with the present invention can be combined to form a plain bearing or a roller bearing. Thus, for example, the outer ring shown in FIG. 2a and the inner ring shown in FIG. 4a can be combined to form a plain bearing or a roller bearing. A bearing ring in accordance with the present invention may also be combined with a conventional one-piece bearing ring to form a plain bearing or a roller bearing.

The principles, preferred embodiments and methods of manufacture of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bearing ring with a track for retaining rolling bodies or a sliding surface comprising:
    a first ring part having a first peripheral surface forming the track or sliding surface and a second peripheral surface;
    a second ring part having a first peripheral surface and a second peripheral surface;
    the first ring part and the second ring part being arranged concentrically to one another;
    the first ring part and the second ring part being pressed together in such a way that the second peripheral surface of the first ring part is plastically molded into the first peripheral surface of the second ring part through an axial flow forming process of the second ring part.

2. The bearing ring in accordance with claim 1, wherein the first ring part has a greater hardness than the second ring part.

3. The bearing ring in accordance with claim 1, wherein the second peripheral surface of the first ring part possess a cylindrical shape in a first axial portion and deviates from the cylindrical shape at least in a second axial portion at a front end of the first ring part in the direction of a reduction of a cross-section of the first ring part.

4. The bearing ring in accordance with claim 3, wherein the deviation from the cylindrical shape at least in the second axial portion increases continuously toward the front end.

5. The bearing ring in accordance with claim 4, wherein the second axial portion includes one section in which the deviation toward the front end increases linearly and another section in which the deviation towards the front end increases non-linearly.

6. The bearing ring in accordance with claim 3, wherein the second axial portion includes one section in which the deviation toward the front end increases linearly and another section in which the deviation towards the front end increases non-linearly.

7. The bearing ring in accordance with claim 1, wherein the second ring part has a radially outwardly directed flange.

8. The bearing ring in accordance with claim 1, wherein the bearing ring is an inner bearing ring.

9. The bearing ring in accordance with claim 1, wherein the bearing ring is an outer bearing ring.

10. The roller bearing or plain bearing in accordance with claim 1, wherein the second ring part has a radially outwardly directed flange.

11. A roller bearing or plain bearing comprising:
    an inner ring; and
    an outer ring,
    at least one of the inner ring and the outer ring comprising:
        a first ring part having a first peripheral surface forming a track or sliding surface and a second peripheral surface;
        a second ring part having a first peripheral surface and a second peripheral surface, the second ring part being positioned concentrically to the first ring part;
        the first ring part and the second ring part being pressed together with the second peripheral surface of the first ring part being plastically molded into the first peripheral surface of the second ring part through axial flow forming in the second ring part.

12. The roller bearing or plain bearing in accordance with claim 11, wherein the first ring part has a greater hardness than the second ring part.

13. The roller bearing or plain bearing in accordance with claim 11, wherein the second peripheral surface of the first ring part possess a cylindrical shape over a first axial portion, a conical shape over a second axial portion adjoining the first axial portion and a convex shape at a front end of the first ring part.

14. The roller bearing or plain bearing in accordance with claim 13, wherein the first ring part has a radially inwardly directed flange.

15. A method for producing a bearing ring having a track for retaining rolling bodies or a sliding surface comprising:
    engaging a first peripheral surface of a first ring part with a first tool to press the first peripheral surface of the first ring part into a predetermined shape, the first peripheral surface of the first ring part constituting the track or sliding surface, the first ring part having a second peripheral surface;

supporting a second ring part having first and second peripheral surfaces with a second tool so that the second tool supports the second peripheral surface of the second ring part;

pressing the first ring part together with the second ring part through use of the first tool to plastically mold a contour of the second peripheral surface of the first ring part into the first peripheral surface of the second ring part through an axial flow forming process and form a bearing ring having the first and second ring parts arranged concentrically to one another; and removing the first tool from the first ring part and the second tool from the second ring part.

16. The method in accordance with claim 15, wherein prior to pressing the first ring part together with the second ring part, a radial overlap of at least 100 µm exists between the second peripheral surface of the first ring part and the first peripheral surface of the second ring part.

17. The method in accordance with claim 15, wherein prior to pressing the first ring part together with the second ring part, an overlap exists between the first ring part and the second ring part which corresponds to a maximum wall thickness of the first ring part after being gripped by the first tool plus at least 50 µm.

18. The method in accordance with claim 15, wherein the second ring part possesses a wall thickness that is reduced during the axial expansion.

19. The method in accordance with claim 18, wherein the wall thickness of the second ring part is reduced between 5% and 20%.

20. The method in accordance with claim 18, wherein the wall thickness of the second ring part is reduced between 10% and 18%.

21. The method in accordance with claim 18, wherein the wall thickness of the second ring part is reduced by approximately 12%.

* * * * *